United States Patent [19]

Murao et al.

[11] Patent Number: 4,824,913

[45] Date of Patent: Apr. 25, 1989

[54] PROCESS FOR PREPARING WATER-SOLUBLE POLYMER

[75] Inventors: Yoshikazu Murao, Machida; Shigeru Sawayama, Yokohama; Kohichi Satoh, Zama, all of Japan

[73] Assignee: Mitsubishi Chemical Industries Limited, Tokyo, Japan

[21] Appl. No.: 46,382

[22] Filed: May 6, 1987

[30] Foreign Application Priority Data

May 13, 1986 [JP] Japan ................................ 61-108795

[51] Int. Cl.[4] ................................................ C08F 8/10
[52] U.S. Cl. .................................. 525/344; 525/328.2; 525/359.1; 525/359.3; 525/378
[58] Field of Search ...................... 525/378, 344, 359.1, 525/359.3

[56] References Cited

U.S. PATENT DOCUMENTS

| 4,421,602 | 12/1983 | Brunnmueller et al. | 162/168.2 |
| 4,444,667 | 4/1984 | Burkert et al. | 210/735 |
| 4,500,437 | 2/1985 | Engelhardt et al. | 526/303.1 |
| 4,578,515 | 3/1986 | Dawson et al. | 526/307.1 |

*Primary Examiner*—Joseph L. Schofer
*Assistant Examiner*—Bernard Lipman
*Attorney, Agent, or Firm*—Oblon, Fisher, Spivak, McClelland & Maier

[57] ABSTRACT

Disclosed herein is a process for preparing a water-soluble polymer, which comprises granulating a hydrous gel-like polymer obtained by polymerizing N-vinylformamide in the form of an aqueous solution of which a monomer concentration is 20 to 60% by weight, dispersing the formed polymer particles in methanol and contacting them with an aqueous solution of ammonium salt of a monovalent acid in an amount of 1 to 200% by mole based on the formamide groups in said polymer, thereby partially modifying the formamide groups in the polymer.

12 Claims, No Drawings

PROCESS FOR PREPARING WATER-SOLUBLE POLYMER

BACKGROUND OF THE INVENTION

The present invention relates to a process for preparing water-soluble polymers, more particularly to a process for preparing water-soluble polymers comprising partially hydrolyzing N-vinylformamide polymers.

The water-soluble polymers produced by partially modifying N-vinylformamide polymers are known as a cationic high-molecular weight flocculant having excellent flocculating performance, but as regards the manufacturing process thereof, there is known only a method in which the polymers are produced in the form of an aqueous solution. As a method for producing such water-soluble polymer in the form of powder, the present applicant had previously proposed a process comprising subjecting N-vinylformamide to a high-concentration solution polymerization to form a hydrous gel-like polymer, granulating this gel-like polymer, modifying the granulated polymer in methanol in the presence of an acid, and then dehydrating the product by adding methanol, thereby obtaining the objective polymer in a granular form.

This process, however, has the following problems. It is subject to certain limitation in reducing the particle size of the hydrous gel-like polymer, and the acid used for modifying the polymer is needed in an excess amount. Also, the methanol dehydration rate of the modified polymer is low, and further, since the drying rate of the dehydrated polymer by vacuum drying or hot air drying is low, the polymer would often be degraded due to heat load at drying, and worsened in water solubility.

As a result of the present inventors' studies for solving the problems, it has been found that a process for producing a water-soluble polymer comprises granulating the hydrous gel-like polymer obtained by polymerizing an aqueous N-vinylformamide in the form of an aqueous solution of which a monomer concentration is 20 to 60% by weight, dispersing the produced particles in methanol and contacting them with an aqueous solution of ammonium salt of a monovalent acid in an amount of 1 to 200% by mole based on the formamide groups in the polymer to partially modify the formamide groups in the polymer, thereby obtaining a powdery water-soluble polymer having excellent drying characteristics and water solubility, and the present invention has been attained on the basis of this finding.

SUMMARY OF THE INVENTION

In an aspect of the present invention, there is provided a process for preparing a water-soluble polymer, which comprises granulating a hydrous gel-like polymer obtained by polymerizing N-vinylformamide in the form of an aqueous solution of which a monomer concentration is 20 to 60% by weight, dispersing the formed polymer particles in methanol and contacting them with an aqueous solution of ammonium salt of a monovalent acid in an amount of 1 to 200% by mole based on the formamide groups in the polymer, thereby partially modifying the formamide groups in the polymer.

DETAILED DESCRIPTION OF THE INVENTION

In the present invention, the hydrous gel-like polymer of N-vinylformamide is synthesized by polymerization in a high-concentration aqueous solution of which a monomer concentration is 20 to 60% by weight. Polymerization can be accomplished according to known method. For example, there can be employed a method in which an aqueous monomer solution is aerated with an inert gas, then a polymerization initiator is added thereto, and the thus obtained mixture is heat and maintained at a predetermined temperature. Any type of radical polymerization initiators can be used as the polymerization initiator, but it is preferred to use a water-soluble azo radical polymerization initiator such as 2,2'-azobis(2-amidinopropane) hydrochloride, 4,4'-azobis(4'-cyanovaleric acid) and the like. The amount of the polymerization initiator used is usually 500 to 5,000 ppm, preferably 1,000 to 3,000 ppm based on the monomer. The pH for the polymerization is preferably 6 to 8. The polymerization initiating temperature is usually 20° to 50° C., and the polymerization time is in the range of 0.5 to 5 hours. The obtained hydrous gel-like polymer is then granulated into a particle size of 3 to 7 mm by a granulator such as a mincing extruder. In granulation, if necessary, an anti-blocking agent such as polyethylene glycol, polypropylene glycol and the like may be added.

In the present invention, methanol is used in an amount of 1 to 5 times by weight, preferably 2 to 4 times by weight the whole amount of water in the system. As the ammonium salt allowed to exist in methanol or the hydrous gel-like polymer in carrying out modification, there can be used the salts composed of primary, secondary or tertiary amines and monovalent acids, or tetra-substituted ammonium compounds. Typical examples of such salts are ammonium choride, ammonium bromide, methylamine hydrochloride, ethylamine hydrochloride, dimethylamine hydrochloride, ammonium sulfamate, choline chloride and the like. Among them, ammonium chloride, choline chloride and ammonium sulfamate are especially preferred.

The amount of ammonium salt used for modification is in the range of 1 to 200% by mole, preferably 5 to 100% by mole, based on the formamide groups in the hydrous gel-like polymer. The addition of ammonium salt to the dispersion may be made in form of powder, aqueous solution of methanol solution.

As means for making ammonium salt coexist in the system, for example, the following methods: ammonium salt is added in the course of solution polymerization; ammonium salt is added in methanol; ammonium or an amine is included beforehand in the system and then an acid is added; and an acid is included beforehand in the system and then ammonium or an amine is added may be exemplified.

For more remarkably enhancing the effect of ammonium salt, it is preferable to make ammonium salt coexist with the hydrous gel-like polymer in methanol before the modification reaction and to conduct a pretreatment in which the mixture is stirred under heating at a temperature of not less than 30° C., preferably 40° to 60° C., for a period of 15 to 200 minutes, preferably 30 to 120 minutes.

The modification is carried out usually in the presence of an acid. The acid used for such modification is usually an inorganic acid such as hydrochloric acid, sulfuric acid, nitric acid, phosphoric acid, etc., or an organic acid such as acetic acid, propionic acid, sulfamic acid, alkanesulfonic acid having 1 to 6 carbon atoms, formic acid, etc. Hydrochloric acid, sulfamic acid and alkanesulfonic acid are preferred.

The modification in the present invention is usually carried out in such a way that 10 to 90% by mole of formamide groups in the polymer are modified into an acid salt of amino groups. The amount of the acid used is properly in the range of 1 to 2 times the amount of formamide groups by mole. The modification treatment is usually carried out by making the hydrous gel-like polymer particles and the ammonium salt to coexist in methanol, subjecting the mixture to a pretreatment, further adding a predetermined amount of an acid and then stirring the mixture under heating. The temperature used for this treatment is usually 50° to 90° C., but in case the treating temperature becomes higher than the boiling temperature of the mixture, it needs to pressurize the system. This modification treatment is conducted for a period of usually 3 to 10 hours. After the modification, the mixture is further added with methanol to effect dehydration of polymer particles and then powdered by a conventional method. For example, the polymer particles are separated by filtration and then residual water and methanol adhering to the particle surfaces are removed from the polymer particles by hot air drying, thereby recovering the powdery polymer.

According to the present invention, by conducting the acid modification of the hydrous gel-like polyvinylformamide in methanol in the presence of ammonium salt, the polymer is swollen or dissolved in methanol to enhance the reactivity to the acid in the early phase of the modification reaction, and as a result the amount of the acid to be used may be reduced. Also, as the modification proceeds, the partially modified polymer separates out in the form of fine particles in methanol, so that dehydration and drying of the polymer becomes easy and there can be produced a high-quality powdery polymer at high efficiency. Thus, the method of the present invention is of great industrial value.

The present invention will hereinafter be described more particularly by showing the examples thereof, which examples, however, are merely intended to be illustrative and not limitative of the embodiments of the invention.

EXAMPLES 1-6 AND COMPARATIVE EXAMPLES 1-3

500 g of an aqueous solution of N-vinylformamide (50% by weight) was supplied into a fluorine resin-lined rectangular polymerizer (the depth of the solution in the polymerizer being 10 mm), and the system was aerated with nitrogen gas. Then 10 g of 2,2'-azobis(2-amidinopropane) hydrochloride (2,000 ppm based on the weight of the monomer) was added in the form of a 10 wt% aqueous solution into the aqueous monomer solution as polymerization initiator and the polymerization was carried out at 40° C. for 4 hours. The thus obtained hydrous gel-like polymer was granulated by a screw type mincing extruder, thereby obtaining the polymer particles having an average diameter of 5 mm.

10 g of the hydrous gel-like polymer of N-vinylformamide and 20 g of methanol were supplied into a 50 ml four-necked flask provided with a stirrer and a condenser, and then ammonium salt of the kind and amount shown in Table 1 was added in the form of a 25% aqueous solution to the mixture under stirring. The mixed solution was stirred for 10 minutes, then heated on a hot water bath of 67° C. and kept stirred for 3 hours. The hydrous gel-like polymer was swollen in methanol. Then 4.0 g of 35% hydrochloric acid (equivalent to 0.55 moles of hydrogen chloride to one mole of formamide group) was added to the methanol solution under stirring and heated on the hot water bath of 67° C. In the case of the system where ammonium chloride, ammonium sulfamate or choline chloride coexisted, after addition of hydrochloride, the hydrous gel-like polymer was once turned into the state of a viscous solution from the dispersed state, but 20 minutes later, the polymer again separated out in the form of fine particles in methanol. Such phenomenon didn't take place in the system where no the compound was added and the system where sodium chloride or ammonium sulfate were added. 4 hours thereafter, the modified polymer was filtered out, and after dehydrated in methanol, it was further filtered. The resulting product was hot-air dried at 90° C. for 60 minutes to obtain a powdery polymer.

The modification rate and form of the obtained powdery polymers are shown in Table 1.

TABLE 1

| | Kind of ammonium salt | Amount of ammonium salt added (mol)* | Modification rate (%) | Form of recovered polymer |
| --- | --- | --- | --- | --- |
| Example 1 | NH$_4$Cl | 0.05 | 45.0 | Fine particles, partly massed. |
| Example 2 | " | 0.10 | 49.4 | Fine particles, about 0.5 m/m in diameter. |
| Example 3 | " | 0.20 | 54.9 | Fine particles, about 0.5 m/m in diameter. |
| Example 4 | " | 0.50 | 54.9 | Fine particles, about 0.5 m/m in diameter. |
| Example 5 | NH$_2$SO$_3$NH$_4$ | 0.09 | 47.0 | Fine particles, about 0.5 m/m in diameter. |
| Example 6 | Choline chloride | 0.08 | 52.2 | Fine particles, about 0.5 m/m in diameter. |
| Comp. Example 1 | NaCl | 0.2 | 46.0 | Lumpy, about 3 m/m in diameter. |
| Comp. Example 2 | (NH$_4$)$_2$SO$_4$ | 0.2 | 46.6 | Lumpy, about 3 m/m in diameter. |
| Comp. Example 3 | No compound added | — | 40.3 | Lumpy, about 3 m/m in diameter. |

(Note)
*Number of moles to one mole of formamide group.

What is claimed is:

1. A process for preparing a powdery water-soluble polymer, which comprises granulating a hydrous gel-like polymer obtained by polymerizing N-vinylformamide in the form of an aqueous solution of which a monomer concentration is 20 to 60% by weight, dispersing the formed polymer particles in methanol and contacting them with an acid in the presence of ammonium salt of a monovalent acid in an amount of 1 to 200% by mole based on the formamide groups in said polymer, thereby partially modifying the formamide groups in said polymer to acid salt of amine groups.

2. The process according to claim 1, wherein the polymerization of the hydrous gel-like polymer is carried out at a pH of 6 to 8 and a polymerization initiating temperature of 20° to 50° C. for a period of 0.5 to 5 hours in the presence of 500 to 5,000 ppm of a polymerization initiator.

3. The process according to claim 1, wherein the amount of methanol is 1 to 5 times by weight the whole amount of water in the system.

4. The process according to claim 1, wherein the ammonium salt is a salt composed of a primary, secondary or tertiary amine and a monovalent acid, or a tetra-substituted ammonium compound.

5. The process according to claim 4, wherein the ammonium salt is ammonium chloride, ammonium bromide, methylamine hydrochloride, ethylamine hydrochloride, dimethylamine hydrochloride, ammonium sulfamate or choline chloride.

6. The process according to claim 1, wherein the amount of ammonium salt is 5 to 100% by mole based on the formamide groups in the hydrous gel-like polymer.

7. The process according to claim 1, wherein before the modification reaction, an ammonium salt is made to coexist with the hydrous gel-like polymer in methanol, and a heating and stirring pretreatment is conducted at a temperature of not less than 30° C. for a period of 15 to 200 minutes.

8. The process according to claim 1, wherein the modification treatment is carried out in the presence of an acid.

9. The process according to claim 8, wherein the amount of the acid used is 1 to 2 times by mole the amount of formamide groups.

10. The process according to claim 1, wherein the modification treatment is conducted in such a way that 10 to 90% by mole of the formamide groups in the hydrous gel-like polymer will turn into a salt of amino groups.

11. The process according to claim 1, wherein the modification treatment comprises subjecting to the pretreatment of claim 7, adding an acid according to claim 9, and subjecting to a heat treatment at 50° to 90° C. for 3 to 10 hours.

12. In a process for preparing a powdery water-soluble polymer, which comprises granulating a hydrous gel-like polymer obtained by polymerizing N-vinylformamide in the form of an aqueous solution of which a monomer concentration is 20 to 60% by weight, dispersing the formed polymer particles in methanol and contacting them with an acid, thereby partially modifying the formamide groups in said polymer to acid salt of amino groups, the improvement which comprises conducting the modification in the presence of ammonium salt of a monovalent acid in an amount of 1 to 200% by mole based on the formamide groups in said polymer.

* * * * *